SELECTIVE SIGNALING SYSTEM

Filed April 21, 1948 3 Sheets-Sheet 1

Roelof Maarten Marie Oberman INVENTOR

BY

[signature]

Aug. 21, 1951 R. M. M. OBERMAN 2,564,766

SELECTIVE SIGNALING SYSTEM

Filed April 21, 1948 3 Sheets-Sheet 2

INVENTOR
Roelof Maarten Marie Oberman
BY
[signature]

Aug. 21, 1951 R. M. M. OBERMAN 2,564,766

SELECTIVE SIGNALING SYSTEM

Filed April 21, 1948 3 Sheets-Sheet 3

INVENTOR
Roelof Maarten Marie Oberman
BY

Patented Aug. 21, 1951

2,564,766

UNITED STATES PATENT OFFICE 2,564,766

SELECTIVE SIGNALING SYSTEM

Roelof Maarten Marie Oberman, The Hague, Netherlands

Application April 21, 1948, Serial No. 22,425
In the Netherlands April 21, 1947

12 Claims. (Cl. 177—353)

This invention relates to a selecting and registering system responsive to different electrical signal criteria.

The object of the invention is to provide an improved method of receiving and registering intelligence transmitted in the form of different voltages, or different A. C. frequencies or superpositions thereof.

The invention includes the provision of a series of twin groups of selector relays, both relays of each twin group of selector relays being interrelated to allow only one relay of each of said groups to operate.

The invention further includes a discriminator device successively controlling said selector relays, selecting one half of the possible available testing criteria and expelling the other half for the next twin selector relay group.

In case the signal criteria are given in the form of different voltages, the invention is carried out in such a way that a test conductor is successively biased to a voltage in the middle of the progression of voltages to be selected for further hunting. The said progression being bisected, the discriminator device selects one of the halves for a following bisection.

In case the signal criteria are given in the form of different A. C. frequencies or mixtures thereof the invention can be carried out in such a way, that band filters are successively introduced and the discriminator device induces the twin groups of selector relays to operate according to the presence or absence of the corresponding frequency in the incoming signal. It can easily be shown that every such selection expels exactly half of the remaining criteria and that consequently this method also represents a chain of bisections.

Figure 1:
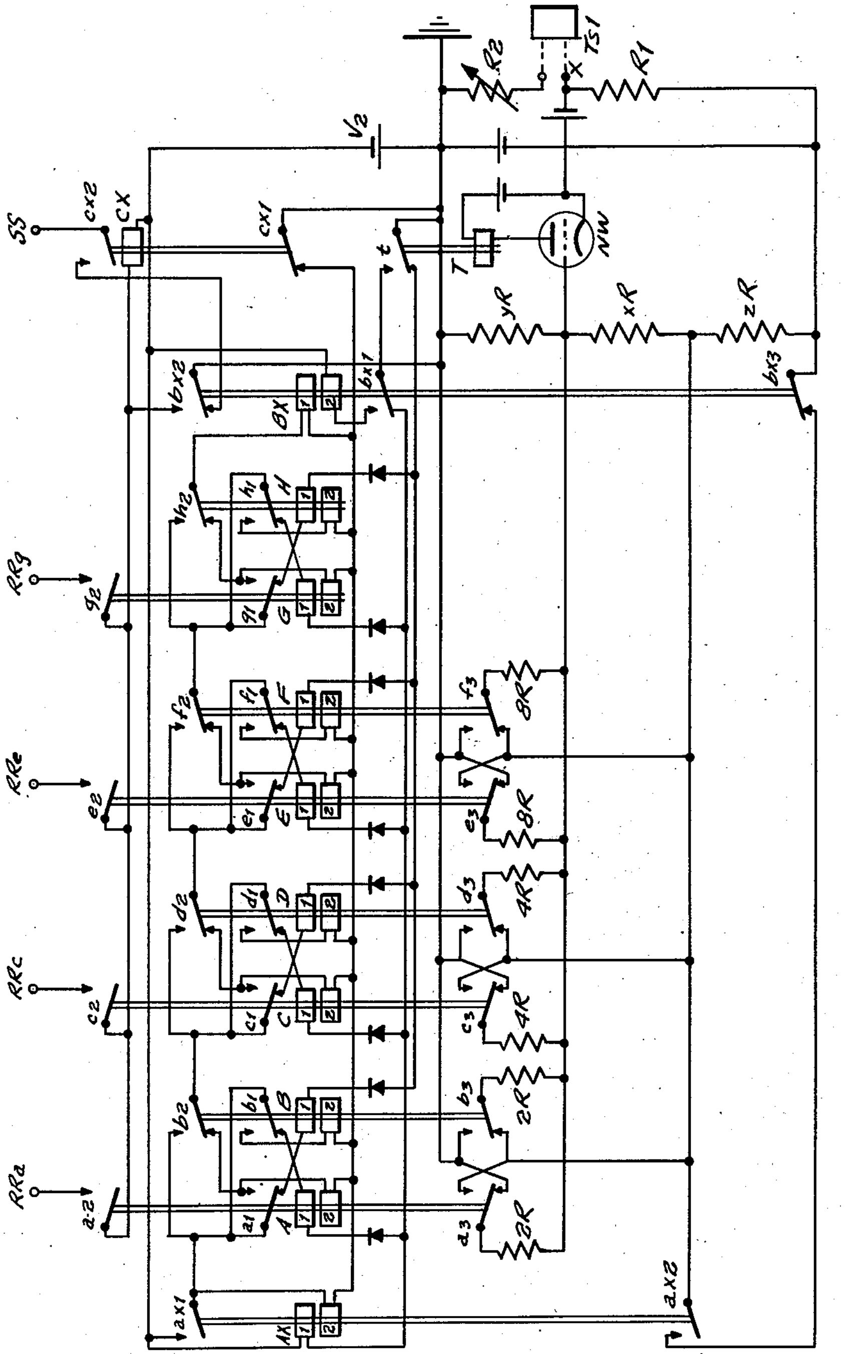
Figure 2:
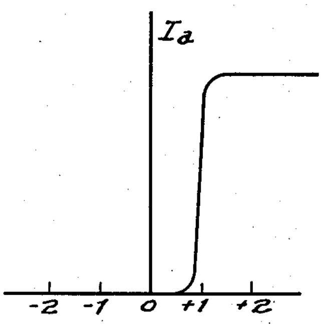

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows by way of non-exclusive example an embodiment of the invention in which 16 different voltages can be received and registered, Fig. 2 is a diagram of the characteristics of the vacuum tube which is used as a discriminator device for the embodiment shown in Fig. 1.

Figure 3:
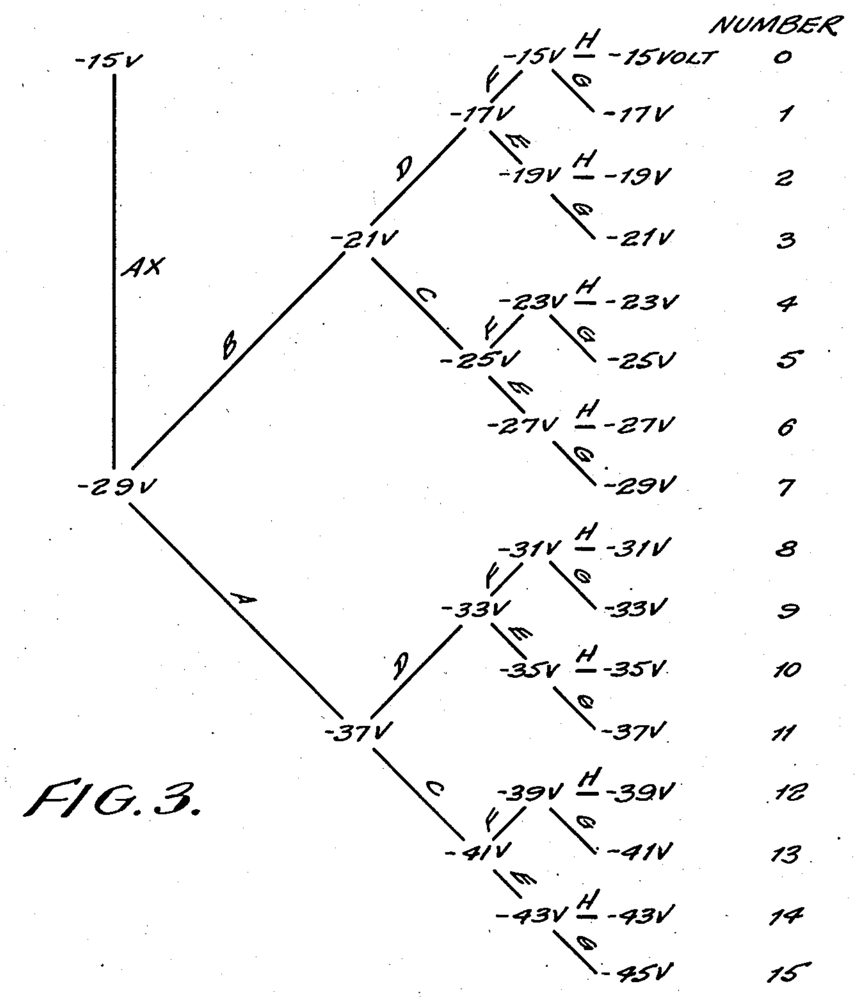
Figure 4:
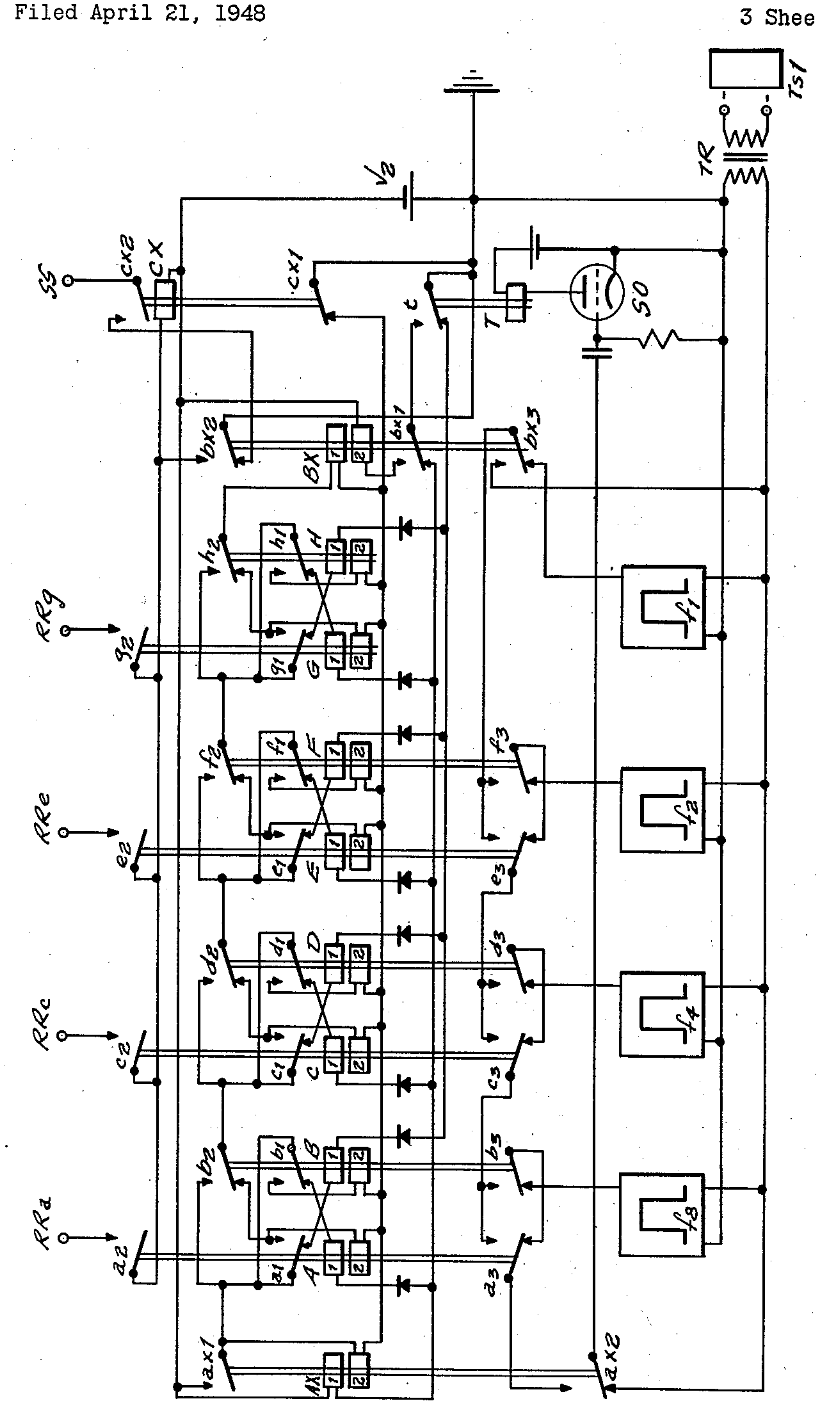

Fig. 3 diagrammatically represents the operation of the test voltage biasing arrangement of Fig. 1, and Fig. 4 shows an embodiment with a selecting system responsive to combinations of 4 superposed A. C. frequencies.

The arrangement according to Fig. 1 is assumed to be fed by a 58 volts battery V, from which the signalling voltages and the testing voltages are derived. A second battery $V_2$ is shown to provide the energy for the windings of relays, but obviously these batteries may be the same.

The discriminator is represented by the vacuum tube NW. The arrangement contains four pairs of relays A, B; C, D; E, F; and G, H, and a starting relay AX, a stopping relay BX and a breaking relay CX. The relays A, C, E, and G are termed hereinafter the first relays of each pair, whereas the relays B, D, F and H are termed hereinafter the second relays of the pairs, respectively. In Fig. 1 all relays are shown in the de-energized position. Relay A controls three contacts $A_1$, $A_2$ and $A_3$ and the same holds correspondingly for relays C and E. The contact $A_1$ is termed hereinafter the first contact and the contact $A_3$ the second contact of relay A, and correspondingly the contacts $C_1$ and $C_3$ are termed the first and second contacts, respectively, of relay C and $E_1$ and $E_3$ the first and second contacts or relay E. The fourth relay G has only a first contact $G_1$ but no second contact $G_3$. The relays B, E, F, and H have each a first contact $B_1$, $D_1$, $F_1$, $H_1$, respectively, and the relays B, D, and F have also a second contact $B_3$, $D_3$ and $F_3$, respectively. The first contact $A_1$ is connected in series with the winding I of relay B and the first contact $B_1$ of relay B is connected in series to the first winding of relay A and so on for the other pairs of relays CD; EF; and GH. The second contacts $A_3$ to $F_3$ are connected in series to resistors 2R . . . 8R, which have as more fully described hereinafter, a certain proportion. The resistors of the test voltage potentiometer arrangement $yR$, $xR$, $zR$, 2R, 4R, 8R are so dimensioned that, with all relays de-energized the grid of the vacuum tube NW is biased with a negative voltage of −15 volts.

The voltage of feeding battery V is divided in three parts by the resistors $yR$, $xR$, and $zR$ connected in series. Parallel to resistor $yR$, are one resistor 2R, one resistor 4R and one resistor 8R, these resistors having resistivities in the proportion 1:2:4. Parallel to resistor $xR$ are the three other resistors 2R, 4R and 8R. Resistor $xR$ has the same resistance as resistor $yR$.

The battery sends a current through an adjustable resistor $R_2$, incoming line, sender $Tsl$ and resistance $R_1$. The voltage of the point X on the incoming line on the side of resistance $R_1$ will thus be determined by the value of resistance $R_2$, the line and the sender. Resistance $R_2$ is adjusted so that in the zero or "normal" position of the sender point X is biased to −15 volts which equals the normal voltage of the grid of tube NW.

As can be seen from the curve in Fig. 2 the vacuum tube NW remains inoperative if the grid voltage is equal to or more negative than the signal voltage. In the sender Tsl different resistivities can be switched into the line, making the point X more negative by adding 2, 4, 6 etc. up to 30 volts, and thus causing one of the voltages of the progression —15, —17, . . . —43, —45 to bias the point X. This means that apart from the zero signal (—15 volts) fifteen different signals can be given.

Any of these fifteen voltages —17 to —45 volts will render the tube NW operative and in consequence the test relay T operates and closes a circuit for the winding I of the starting relay AX, which remains operative by its second winding $AX_2$ in the circuit: ground, normal contact $cx_1$, winding $AX_2$, make contact $ax_1$ to battery, even if the test relay should move back to normal. The starting relay will remain energized as long as the breaking relay CX is not operated.

Starting relay AX short-circuits the resistance zR which makes the grid of the discriminator tube NW shift to —29 volts in the middle of the progression —15 . . . —45. Should the sender have signalled "number 7," then the point X would also have —29 volts and the tube NW would fall off to normal de-energizing the test relay T. Any lower numbered signal would cause the same effect, but anyone of the signals numbered 8 to 15 would keep the tube NW and the test relay T in operation.

Assuming for the following description that the signal "10" were given, the input voltage is —35 volts. Tube NW and test relay T remain operated after the first shift of the grid to —29 volts and a circuit is closed for the winding I of relay A: ground, make contact *t*, break contact $bx_1$, winding AI, normal contact $b_1$, make contact $ax_1$, to battery.

Relay A operates and closes a circuit for its second winding $A_2$: ground, contact $cx_1$, winding $A_2$, contacts $a_1$ and $ax_1$, battery. Simultaneously the relay B is blocked, the circuit of its winding BI being interrupted at contact $a_1$.

The contact $a_3$ changes its position and shifts one of the resistors 2R, hitherto shunted to resister yR, to be shunted to resistor xR instead. This makes the grid voltage to shift by 8 volts, and as it was —29 volts it now becomes —37 volts bisecting the progression —31 . . . —45. This grid is now 2 volts more negative as the input, the latter being —35 volts given by the assumed signal "10," and consequently tube NW and relay T fall back to normal. Now winding $D_1$ is energized: ground, contact *t*, winding $D_1$, contacts $c_1$, $b_2$, $a_1$ and $ax_1$, battery. Relay D, holding itself for the rest of the selecting operation over contact $d_1$ by means of its second winding $D_2$, makes one of the resistors 4R to shift, and this resistor 4R having a greater resistance than any resistor 2R, its influence on the voltage division is only half as great, namely 4 volts, making the grid voltage (being —37) to take the value —33 volts.

Tube NW and relay T are now rendered operative again and relay E is energized, one of the resistors 8R is shifted, and the grid voltage brought to its end value of —35 volts, equal to the signal voltage.

Tube NW and relay T now become inoperative and winding HI is energized, and at this moment the signal "10" is represented in the position of the relays A to H. The two relays of any group A, B; C, D; E, F; and G, H, excluding each other mutually, the signal can be represented by the condition of A, C, E and G, viz. for signal "10":

| relay | A | C | E | G |
|---|---|---|---|---|
| energized | yes | no | yes | no. |

After this description of the operation for selecting the incoming signal "10" it will be clear that for any other signal imposing another voltage on the cathode of test tube NW the relays A to H will also hunt for equilibrium voltage in four stages, as diagrammatically shown in Fig. 3. The condition of the relays A, C, E and G in each case is:

| signal | | relay | | | |
|---|---|---|---|---|---|
| number | voltage | A | C | E | G |
| 0 | —15 | — | — | — | — |
| 1 | —17 | — | — | — | + |
| 2 | —19 | — | — | + | — |
| 3 | —21 | — | — | + | + |
| 4 | —23 | — | + | — | — |
| 5 | —25 | — | + | — | + |
| 6 | —27 | — | + | + | — |
| 7 | —29 | — | + | + | + |
| 8 | —31 | + | — | — | — |
| 9 | —33 | + | — | — | + |
| 10 | —35 | + | — | + | — |
| 11 | —37 | + | — | + | + |
| 12 | —39 | + | + | — | — |
| 13 | —41 | + | + | — | + |
| 14 | —43 | + | + | + | — |
| 15 | —45 | + | + | + | + |

The intelligence thus stored in the relays A, C, E, G is now transferred to the register by way of the contacts $a_2$, $c_2$, $e_2$, and $g_2$ so far as they are closed.

As soon as either G or H operates a circuit is closed for the stopping relay BX, and this relay gives momentary ground connection over contacts $bx_2$ and $a_2$ to $g_2$ for the register relays $RR_a$, $RR_c$, $RR_e$ and $RR_g$ (not shown). The register relays are provided with self-holding means.

Contact $bx_3$ being opened, resistor ZR is no longer shunted, and the grid voltage shifts to a less negative value making tube NW and relay T operative; a circuit is closed for the auxiliary winding $BX_2$ of the stop relay: ground, make contacts *t* and $bx_1$, winding $BX_2$, battery, keeping this relay in operation as long as the signal remains in force.

Meanwhile over said contact $bx_2$ the winding of the breaking relay CX is also energized, and now the circuit for the second winding $AX_2$ of the starting relay is broken. The first winding $AX_1$ being opened by contact $bx_1$, the starting relay is restored to normal; consequently by breaking contact $ax_1$, all the selecting relays A to H are restored to normal.

As soon as the prevailing signal stops, the test tube NW, the test relay T and the entire selecting arrangement are restored to normal, being now prepared to receive the next signal.

The sequence switch SS (not shown) is actuated over contacts $bx_2$ and $cx_2$, shifts the selecting arrangement over to e. g. another register.

It will be observed that the starting relay AX and the selecting relays A to H must be of somewhat slower action than the test relay T. If for instance in the above given example with signal "10," after operation of relay A contact *t* were slower than contact $c_1$, relay C would become operative instead of relay D.

It will be obvious too, that relay CX must be slow enough, to allow the actuation of the sequence switch SS. The rectifier cells in the ground leads of the windings $A_1$ to $H_1$ are provided to prevent couplings between the front and the back contacts of the test relay over said windings $A_1$ to $H_1$.

Having now disclosed the operation of one embodiment of the invention it should be remarked that the voltages figured in this example are not essential, and that the number of twin groups of selector relays is not restricted to four.

It is remarked that a Wheatstone bridge can easily be recognized in Fig. 1; the discriminator device representing the galvanometer branch. Obviously the signalling voltages need not be chosen in an arithmetical progression, and the system can be considered and calculated as a system responsive to different sender resistance values.

Fig. 4 shows an embodiment of the invention in which the signal criteria consist of four different A. C. frequencies or mixtures thereof. The four frequencies should be sufficiently different to allow selective band filtering. In the following description the frequencies will be indicated by numbers: *f*8, *f*4, *f*2 and *f*1, and the signals will be assumed to be defined as follows:

| signal No. | frequency present | | | |
|---|---|---|---|---|
| | *f*8 | *f*4 | *f*2 | *f*1 |
| 0 | − | − | − | − |
| 1 | − | − | − | + |
| 2 | − | − | + | − |
| 3 | − | − | + | + |
| 4 | − | + | − | − |
| 5 | − | + | − | + |
| 6 | − | + | + | − |
| 7 | − | + | + | + |
| 8 | + | − | − | − |
| 9 | + | − | − | + |
| 10 | + | − | + | − |
| 11 | + | − | + | + |
| 12 | + | + | − | − |
| 13 | + | + | − | + |
| 14 | + | + | + | − |
| 15 | + | + | + | + |

Any signal number is equal to the sum of the frequency numbers present in the signal.

The discriminator is shown by a vacuum tube detector SO translating any A. C. excitation on the grid into D. C. energizing the winding of the test relay T inserted in the anode circuit.

Zero signal leaves the entire selecting system inoperative, but any other signal received through the transformer TR brings at least one A. C. frequency over the normal contact $ax_2$ of the starting relay to the grid of the detector SO. Similar to the embodiment according to Fig. 1 the starting relay AX operates and the grid now obtains its excitation (if any) over the make contact of $ax_2$, compelling the signal to pass the band filter *f*8. If this frequency is present in the signal, it is admitted to the grid, tube, SO and relay T remain operated and relay A is energized. Half of the signal numbers, numbered 8 to 15, are now selected for further examination, and the other half, numbered 0 to 7, is expelled.

Operation of any one of the relays A or B switches off the filter *f*8 and introduces the filter *f*4; thus the test relay now determines the presence or absence of the frequency *f*4. Assuming again that signal "10" is transmitted, *f*4 is absent and the test relay becomes inoperative, inducing selector relay D to operate. Thus the presence or absence of the four frequencies in the signal is successively tested and stored in the position of the relays A, C, E and F, similar to the preceding embodiment.

The relay D selects the progression numbered 8 to 11, being one half of the numbers 8 to 15 selected by the preceding relay A, and dropping the numbers 12 to 15. Relay F reduces the hunting field to numbers 10 and 11. Finally the test relay, finding frequency *f*1 absent, assigns relay H to select number 10.

It is remarked that the use of a vacuum tube with incandescent cathode as a discriminator is not essential. Other means are known, that could be applied for the purpose, e. g. "cold" cathode tubes.

While I have illustrated and described what I regard to be the preferred embodiment of my invention, nevertheless it will be understood that such is merely exemplary and that numerous modifications and rearrangements may be made therein without departing from the essence of the invention, I claim:

1. An arrangement for converting different electrical signals into different combinations of electrical impulses, comprising in combination, an electron tube having a plurality of electrodes; means for imparting different potentials corresponding to the different signals to one of said electrodes of said electron tube; a plurality of successively operated pairs of relays each including a first relay and a second relay; means for preventing said first relay and said second relay of any of said pairs from being energized simultaneously; means controlled by the output of said electron tube for successively operating said pairs of relays; and means controlled by said relays for biasing another of said electrodes of said electron tube, whereby said electron tube controls said pairs of relays according to the different potentials corresponding to the different signals.

2. An arrangement for converting different electric signals into different combinations of electrical impulses, comprising in combination, an electron tube having a plurality of electrodes; means for imparting different potentials corresponding to the different signals to one of said electrodes of said electron tube; a test relay connected in the anode circuit of said electron tube and having a contact controlled by said test relay so as to take either one of two positions; a plurality of successively operated pairs of relays each including a first relay and a second relay; means for preventing said first relay and said second relay of any of said pairs from being energized simultaneously; means for successively connecting said first relays and said second relays of said pairs, respectively, to said contact controlled by said test relay in one and the other of the two positions thereof; and means controlled by said relays for biasing another of said electrodes of said electron tube, whereby said electron tube controls said pairs of relays according to the different potentials corresponding to the different signals.

3. An arrangement for converting different electric signals into different combinations of electrical impulses, comprising in combination, an electron tube having a plurality of electrodes; means for imparting different potentials corresponding to the different signals to one of said electrodes of said electron tube; a test relay connected in the anode circuit of said electron tube and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively, said windings forming part of one of said relays of any of said pairs being connected in series to said first contact controlled by the other one of said relays of the same of said pairs; means for successively connecting said windings forming part of said first relays and said second relays of said pairs, respectively, to said contact controlled by said test relay in one position and in the other position thereof; means including said second contacts controlled by said relays of said pairs for biasing another of said electrodes of said electrode tube, whereby said electron tube controls said pairs of relays according to the different potentials corresponding to the different signals; a current source; and contacts controlled by said first relays of said pairs, respectively, and connected to said current source so as to yield different combinations of electrical impulses corresponding to the different signals.

4. An arrangement for converting different electric voltages into different combinations of electrical impulses, comprising in combination, an electron tube having a plurality of electrodes; means for imparting the different voltages to one of said electrodes of said electron tube; a plurality of successively operated pairs of relays each including a first relay and a second relay; means for preventing said first relay and said second relay of any of said pairs from being energized simultaneously; means controlled by the output of said electron tube for successively operating said pairs of relays and including resistors connected to another of said electrodes of said electron tube for biasing the same, whereby said electron tube controls said pairs of relays according to the different voltages.

5. An arrangement for converting different electric voltages into different combinations of electrical impulses, comprising in combination, an electron tube having a plurality of electrodes; means for imparting the different voltages to one of said electrodes of said electron tube; a test relay connected in the anode circuit of said electron tube and having a contact controlled by said test relay so as to take either one of two positions; a plurality of successively operated pairs of relays each including a first relay and a second relay; means for preventing said first relay and said second relay of any of said pairs from being energized simultaneously; means for successively connecting said first relays and said second relays of said pairs, respectively, to said contact controlled by said test relay in one and the other of the two positions thereof; and means controlled by said relays and including resistors connected to another of said electrodes of said electron tube for biasing the same, whereby said electron tube controls said pairs of relays according to the different voltages.

6. An arrangement for converting different electric voltages into different combinations of electrical impulses, comprising in combination, an electron tube having a plurality of electrodes; means for imparting the different voltages to one of said electrodes of said electron tube; a test relay connected in the anode circuit of said electron tube and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively, said windings forming part of one of said relays of any of said pairs being connected in series to said first contact controlled by the other one of said relays of the same of said pairs; means for successively connecting said windings forming part of said first relays and said second relays of said pairs, respectively, to said contact controlled by said test relay in one position and in the other position thereof; means including said second contacts controlled by said relays of said pairs and resistors connected, respectively, between said second contacts and another of said electrodes of said electron tube for biasing the same, whereby said electron tube controls said pairs of relays according to the different voltages; a current source; and contacts controlled by said first relays of said pairs, respectively, and connected to said current source so as to yield different combinations of electrical impulses corresponding to the different voltages.

7. An arrangement for converting different electric voltages into different combinations of electrical impulses, comprising in combination, an electron tube having a plurality of electrodes; means for imparting the different voltages to one of said electrodes of said electron tube; a test relay connected in the anode circuit of said electron tube and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively, said windings forming part of one of said relays of any of said pairs being connected in series to said first contact controlled by the other end of said relays of the same of said pairs; means for successively connecting said windings forming part of said first relays and said second relays of said pairs, respectively, to said contact controlled by said test relay in one position and in the other position thereof; means including said second contacts controlled by said relays of said pairs and resistors connected, respectively, between said second contacts and another of said electrodes of said electron tube for biasing the same, said resistors associated with said second contacts controlled by said relays of one of said pairs having twice the resistivity of said resistors associated with said second contacts controlled by said relays of the preceding one in the sequence of said pairs, whereby said electron tube controls said pairs of relays according to the different voltages; a current source; and contacts controlled by said first relays of said pairs, respectively, and connected to said current source so as to yield different combinations of electrical impulses corresponding to the different voltages.

8. An arrangement for converting different electric signals into different combinations of electrical impulses, comprising in combination, a detector having a plurality of electrodes; means for imparting different potentials corresponding to the different signals to one of said electrodes of said detector and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively, said windings forming part of one of said relays of any of said pairs being connected in series to said first contact controlled by the other one of said relays of the same of said pairs; means for successively connecting said windings forming part of said first relays and said second relays of said pairs, respectively, to said contact controlled by said test relay in one position and in the other position thereof; means including said second contacts controlled by said relays of said pairs for biasing another of said electrodes of said detector, whereby said detector controls said pairs of relays according to the different potentials corresponding to the different signals; a current source; and contacts controlled by said first relays of said pairs, respectively, and connected to said current source so as to yield different combinations of electrical impulses corresponding to the different signals.

9. An arrangement for converting different electric frequencies into different combinations of electrical impulses, comprising in combination, an electron tube having a plurality of electrodes; means for imparting the different frequencies to one of said electrodes of said electron tube; a plurality of successively operated pairs of relays each including a first relay and a second relay; means for preventing said first relay and said second relay of any of said pairs from being energized simultaneously; means controlled by the output of said electron tube for successively operating said pairs of relays; and means controlled by said relays and including frequency-responsive filters for biasing another of said electrodes of said electron tube, whereby said electron tube controls said pairs of relays according to the different frequencies.

10. An arrangement for converting different electric frequencies into different combinations of electrical impulses, comprising in combination, an electron tube having a plurality of electrodes; means for imparting the different frequencies to one of said electrodes of said electron tube; a test relay connected in the anode circuit of said electron tube and having a contact controlled by said test relay so as to take either one of two positions; a sequence of successively operated pairs of relays each including a first relay and a second relay; means for preventing said first relay and said second relay of any of said pairs from being energized simultaneously; means for successively connecting said first relays and said second relays of said pairs, respectively, to said contact controlled by said test relay in one and the other of the two positions thereof; and means controlled by said relays and including frequency-responsive band filters for biasing another of said electrodes of said electron tube, whereby said electron tube controls said pairs of relays according to the different frequencies.

11. An arrangement for converting different electric frequencies into different combinations of electrical impulses, comprising in combination, an electron tube having a plurality of electrodes; means for imparting the different frequencies to one of said electrodes of said electron tube; a test relay connected in the anode circuit of said electron tube, and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively; said windings forming part of one of said relays of any of said pairs being connected in series to said first contact controlled by the other one of said relays of the same pairs; means for successively connecting said windings forming part of said first relays and said second relays of said pairs, respectively, to said contact controlled by said test relay in one position and in the other position thereof; means including said second contacts controlled by said relays of said pairs and frequency-responsive band filters connected, respectively, between said second contacts and another of said electrodes of said electron tube for biasing the same, whereby said electron tube controls said pairs of relays according to the different frequencies; a current source; and contacts controlled by said first relays of said pairs, respectively, and connected to said current source so as to yield different combinations of electrical impulses corresponding to the different frequencies.

12. An arrangement for converting different electric frequencies into different combinations of electrical impulses, comprising in combination, a detector having a plurality of electrodes; means for imparting the different frequencies to one of said electrodes of said detector; a test relay connected in the anode circuit of said detector, and having a contact controlled by said test relay so as to take either one of two positions; a sequence of successively operated pairs of relays each including a first relay and a second relay; windings forming part of said relays of said pairs, respectively; first contacts and second contacts controlled by said relays of said pairs, respectively; said windings forming part of one of said relays of any of said pairs being connected in series to said first contact controlled by the other one of said relays of the same pairs; means for successively connecting said windings forming part of said first relays and said second relays of said parts, respectively, to said contact controlled by said test relay in one position and in the other position thereof; means including said second contacts controlled by said relays of said pairs and frequency-responsive band filters connected, respectively, between said second contacts and another of said electrodes of said detector for biasing the same, whereby said detector controls said pairs of relays according to the different frequencies; a current source; and contacts controlled by said first relays of said pairs, respectively, and connected to said current source so as to yield different combinations of electrical impulses corresponding to the different frequencies.

ROELOF MAARTEN MARIE OBERMAN.

REFERENCES CITED

The following references are of record in the file of this patent:

UNITED STATES PATENTS

| Number | Name | Date |
|---|---|---|
| Re. 22,794 | Deakin | Oct. 1, 1946 |
| 2,295,534 | Leathers | Sept. 14, 1942 |
| 2,407,286 | Kinkead | Sept. 10, 1946 |
| 2,486,391 | Cunningham | Nov. 1, 1949 |
| 2,543,050 | Oberman | Feb. 27, 1951 |